(12) United States Patent
May

(10) Patent No.: US 7,718,878 B2
(45) Date of Patent: May 18, 2010

(54) MUSICAL INSTRUMENT STAND WITH ASSISTED EXTENSION

(76) Inventor: Randall L May, 2 Trafalgar, Newport Beach, CA (US) 92660-6830

( * ) Notice: Subject to any disclaimer, the term of this patent is extended or adjusted under 35 U.S.C. 154(b) by 0 days.

(21) Appl. No.: 12/210,021

(22) Filed: Sep. 12, 2008

(65) Prior Publication Data

US 2009/0007754 A1    Jan. 8, 2009

Related U.S. Application Data

(63) Continuation-in-part of application No. 11/450,679, filed on Jun. 9, 2006, now Pat. No. 7,438,266.

(51) Int. Cl.
*G10D 13/02* (2006.01)
(52) U.S. Cl. ..................................... 84/422.1
(58) Field of Classification Search ................... 84/421, 84/422.1, 422.2, 422.3
See application file for complete search history.

(56) References Cited

U.S. PATENT DOCUMENTS

| 5,072,910 | A | 12/1991 | May |
| 5,308,035 | A | 5/1994 | Ross |
| 5,329,873 | A | 7/1994 | Tiballi |
| 6,038,802 | A | 3/2000 | Tidwell |
| 6,491,266 | B1 | 12/2002 | Chen |
| 6,643,966 | B2 | 11/2003 | Schmitt |
| 6,857,607 | B1 | 2/2005 | Burris |
| 7,011,280 | B2 | 3/2006 | Murray et al. |
| 2005/0045786 | A1 | 3/2005 | Tupper et al. |
| 2005/0092878 | A1 | 5/2005 | Murray et al. |
| 2005/0150357 | A1* | 7/2005 | Tanaka ..................... 84/422.3 |
| 2006/0086869 | A1* | 4/2006 | Hsieh ........................ 248/171 |

* cited by examiner

*Primary Examiner*—Kimberly R Lockett
(74) *Attorney, Agent, or Firm*—Kirk A. Buhler; Buhler & Associates

(57) ABSTRACT

Improvements in an expandable musical instrument stand where the components of the stand are constructed with tubular sections. The tubular section telescope with an extension mechanism placed between the tubular members to assist in adjusting the playing height of the musical instrument. The expandable construction allows the musical stand to be broken down into smaller sections to make it easier to transport and simple to erect. The expandable section is ideally used with the center tube with a three or four leg stand where the legs can be collapsible on the center tube or the legs can be constructed with the same or similar construction as the center tube where they can be stacked and clamped with a collar.

15 Claims, 9 Drawing Sheets

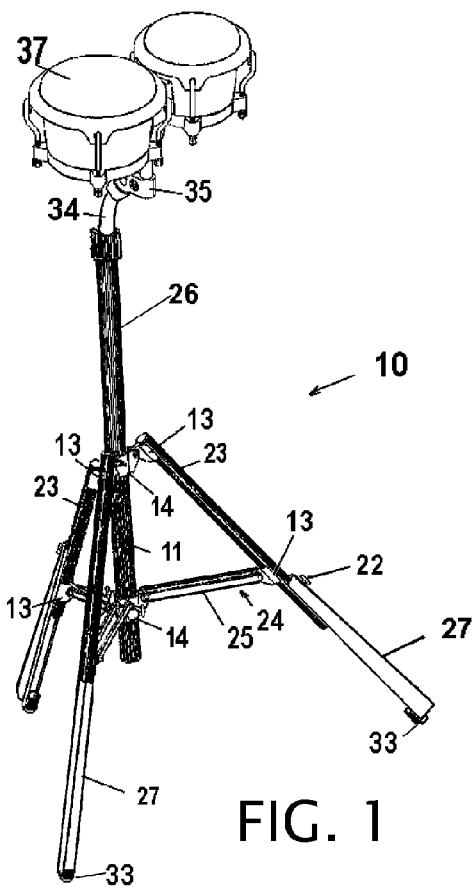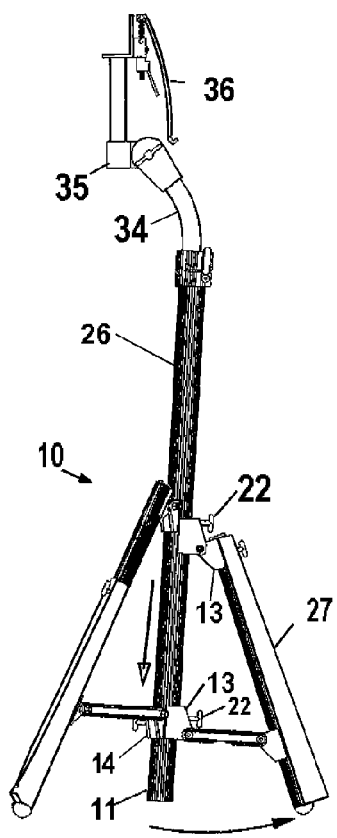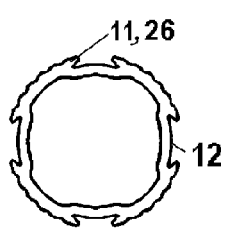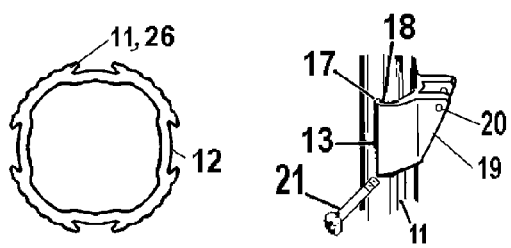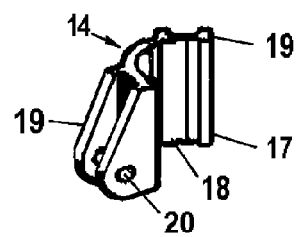
FIG. 1
FIG. 2
FIG. 3
FIG. 4
FIG. 5

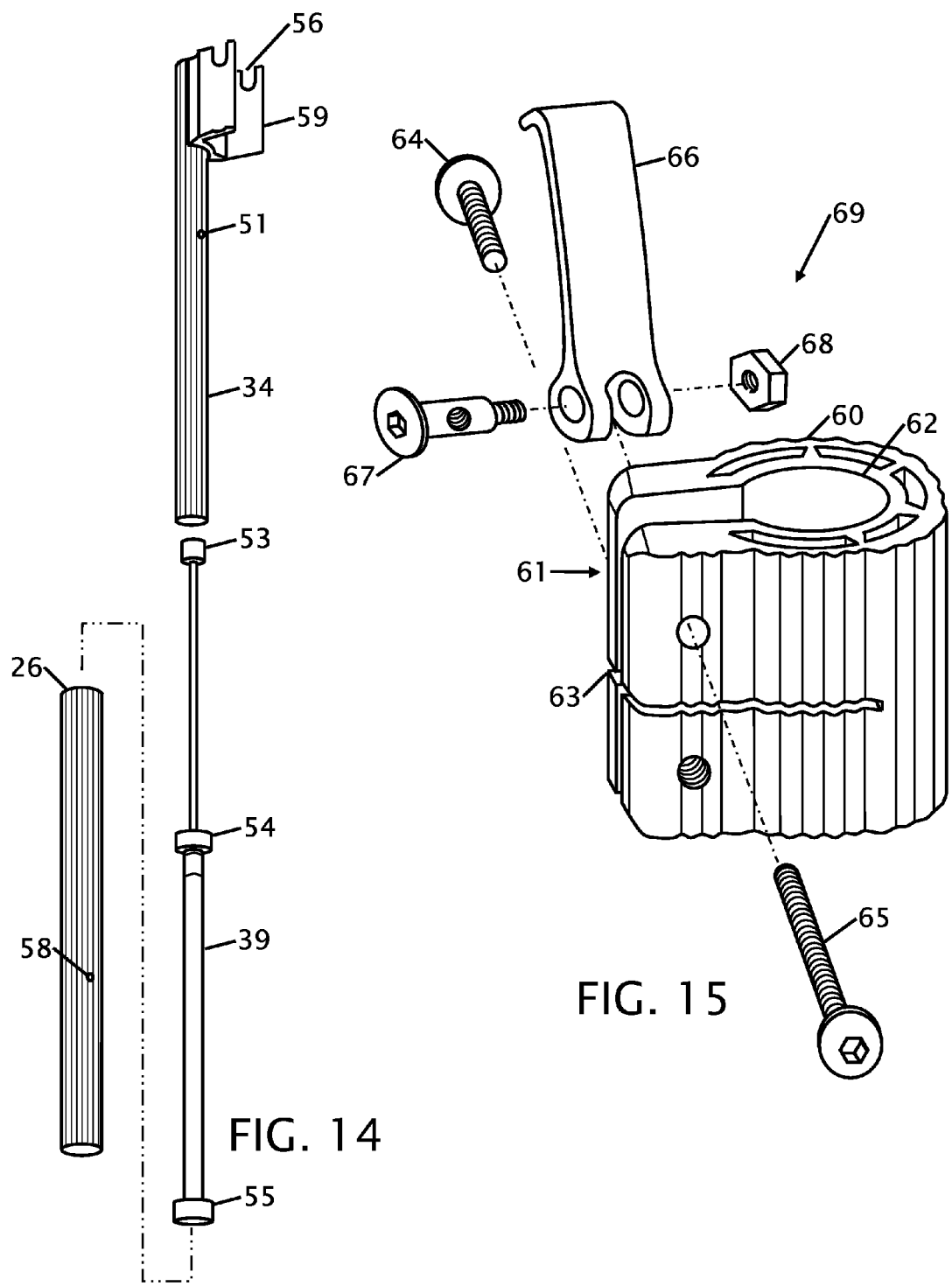

MUSICAL INSTRUMENT STAND WITH ASSISTED EXTENSION

CROSS REFERENCE TO RELATED APPLICATION

This application is a continuation-in-part of applicant's co-pending application Ser. No. 11/450,679 filed Jun. 9, 2006 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1 Field of the Invention

This invention relates generally to an expandable musical instrument stand stands, and more particularly the expandable music stand has a gas strut or similar self expanding device that can be stopped by a user at various amounts of extension to place an instrument on the stand at the desired height.

2 Description of Related Art including Information Disclosed Under 37 CFR 1.97 and 1.98:

Today many tripod and or other types of stands are configured to be collapsible or extendable. One of the major benefits of making stands collapsible or extendable is that that stands can be transported and stored in a smaller size. Most of these stands are desirable for supporting various articles and instruments since they provide selective height adjustment and a stable support. They are particularly useful is supporting such things as cameras, video equipment, telescopes, surveying instruments, and musical instruments. Tripod stands for drums, however, raise special problems when used on steps or stairs of an auditorium or stadium.

There are several patents that describe various adjustable tripod stand devices. Bureau U.S. Pat. No. 1,517,825 shows a tripod support for a table having adjustable legs.

Some patents describe tubular construction where tubes nest inside at least a portion of each other to extend the length of the tubular structure, examples of this type of extendable construction are found in Cantwell et al. U.S. Pat. No. 4,827,958, Tiballi U.S. Pat. No. 5,329,873, Tidwell U.S. Pat. No. 6,038,802 and Burris U.S. Pat. No. 6,857,607. While these each disclose stacking tubular sections upon each other to form a longer tubular section, they all require the joining to be formed with members that engage within each other.

U.S. Pat. No. 6,643,966 issued to Schmitt is formed with rectangular tubes and an internal member is placed between each tubular section to join the tubes together. A pin or other similar hardware is placed through the tubular sections to retain them in place. While these each disclose stacking tubular sections upon each other to form a longer tubular section, they all require the joining to be formed with members that engage completely within each other.

Boehm, U.S. Pat. No. 3,570,130 discloses a holding device for surveying instruments which includes a channel-like mounting bracket with a pair of instrument gripping clamps and a pair of adjustable legs thereon which cooperate with the instrument to form a tripod type support for supporting the instrument in a reference position.

This invention is an improvement over May U.S. Pat. No. 5,072,910. It is distinguished over the prior art in general, and these patents in particular by an adjustable tripod stand with independently adjustable legs which comprises a longitudinal extensible upright portion of telescoping tubular members, a plurality of collar members slidably mounted on the upright portion which are longitudinally adjustable relative to one another and to the upright portion for selective positioning thereon, and a plurality of movable leg members are operatively connected to upper and lower collar members for selective independent longitudinal positioning and radial extension relative to the upright portion and to one another. One leg of the tripod is adjustable in length, a sufficient amount, to permit support on two different stairs or steps of an auditorium or stadium.

What is needed is an adjustable extension mechanism to assist in lifting a musical instrument. The ideal system would allow a performer to expedite raise and lower a musical instrument mounted on an instrument stand with minimal effort where the extension mechanism offsets the weight of the musical instrument and a securing mechanism on the stand maintains the adjusted height. The proposed musical instrument stand with assisted extension satisfies these needs.

BRIEF SUMMARY OF THE INVENTION

It is therefore an object of the present musical instrument stand to provide an expandable musical instrument stand made from extruded sections where the extruded sections include a dovetail feature that allows the extruded tubular sections to be locked together.

It is another object of this musical instrument stand to utilize dovetail locking features to engage tubular sections and allow the stand to become longer. The leg section creates both the leg support and the locking mechanism for the additional tubular extension.

It is another object of this musical instrument stand to allow the overall height of the instrument stand significantly reduced make the stand easier to transport and store, the long center tube support can be split into two or more pieces and assembled using an existing leg clamp to secure the two center tube sections rigidly together.

Another object of this musical instrument stand is to provide an adjustable tripod stand that has two or more independently adjustable movable legs providing versatility and stability in the support system.

Another object of this musical instrument stand is to provide an adjustable tripod stand that allows for the body of the stand to be oriented in a greater off-axis position while maintaining the center of gravity in a stable support system.

Another object of the musical instrument stand is to allow collars that support the legs, to be slidably adjusted past each other to allow for a greater variety of adjustment.

Another object of the musical instrument stand is to provide additional extension legs that can be used in combination with the legs of the tripod stand to give greater extension capability for placement of the tripod stand on uneven surfaces.

Another object of the musical instrument stand is for the geometry of the center tube and the legs to be essentially the same to allow for part commonality and interchangeability.

Another object of the musical instrument stand is to allow the position of the leg brace to be adjustable to allow the angular arc or position of the leg to be adjusted beyond a single fixed fulcrum brace point.

Another object of the musical instrument stand to utilize an assisted lifting mechanism, such as a spring or gas strut, to make adjusting the height of the playing surface of the musical instrument easier. The assisted lifting mechanism allows for an infinite number of heights that the instrument can be adjusted and the adjustment can be made quickly by a performer. Various lifting mechanisms can be used based upon the required force and the amount of extension that is required.

A still further object of this musical instrument stand is to provide an adjustable tripod stand for supporting articles which is simple in construction, light-weight, economical to manufacture, rugged and reliable in use.

A further object of the present musical instrument stand to provide an adjustable tripod stand that has independently adjustable movable legs for supporting cantilevered drums, including bongos, tenors and snare drums.

Various objects, features, aspects, and advantages of the present musical instrument stand will become more apparent from the following detailed description of preferred embodiments of the musical instrument stand, along with the accompanying drawings in which like numerals represent like components.

BRIEF DESCRIPTION OF THE SEVERAL VIEWS OF THE DRAWING(S)

FIG. 1 is an isometric view of a preferred, adjustable-tripod-stand for bongo drums in accordance with one embodiment of the present musical instrument stand.

FIG. 2 is a view in side elevation of the adjustable tripod stand shown in FIG. 1.

FIG. 3 is an end view of one of the center tubes or legs of the tripod.

FIG. 4 is an isometric view of one of the leg clamps positioned on the center tube or leg tube of the tripod.

FIG. 5 is an isometric view of one of the clamps for the tripod shown in FIGS. 1 and 2.

FIG. 14 is an exploded view of the extension mechanism.

FIG. 15 is an exploded view of the clamping mechanism for the extension lift mechanism.

DETAILED DESCRIPTION OF THE INVENTION

Figures 6, 7:
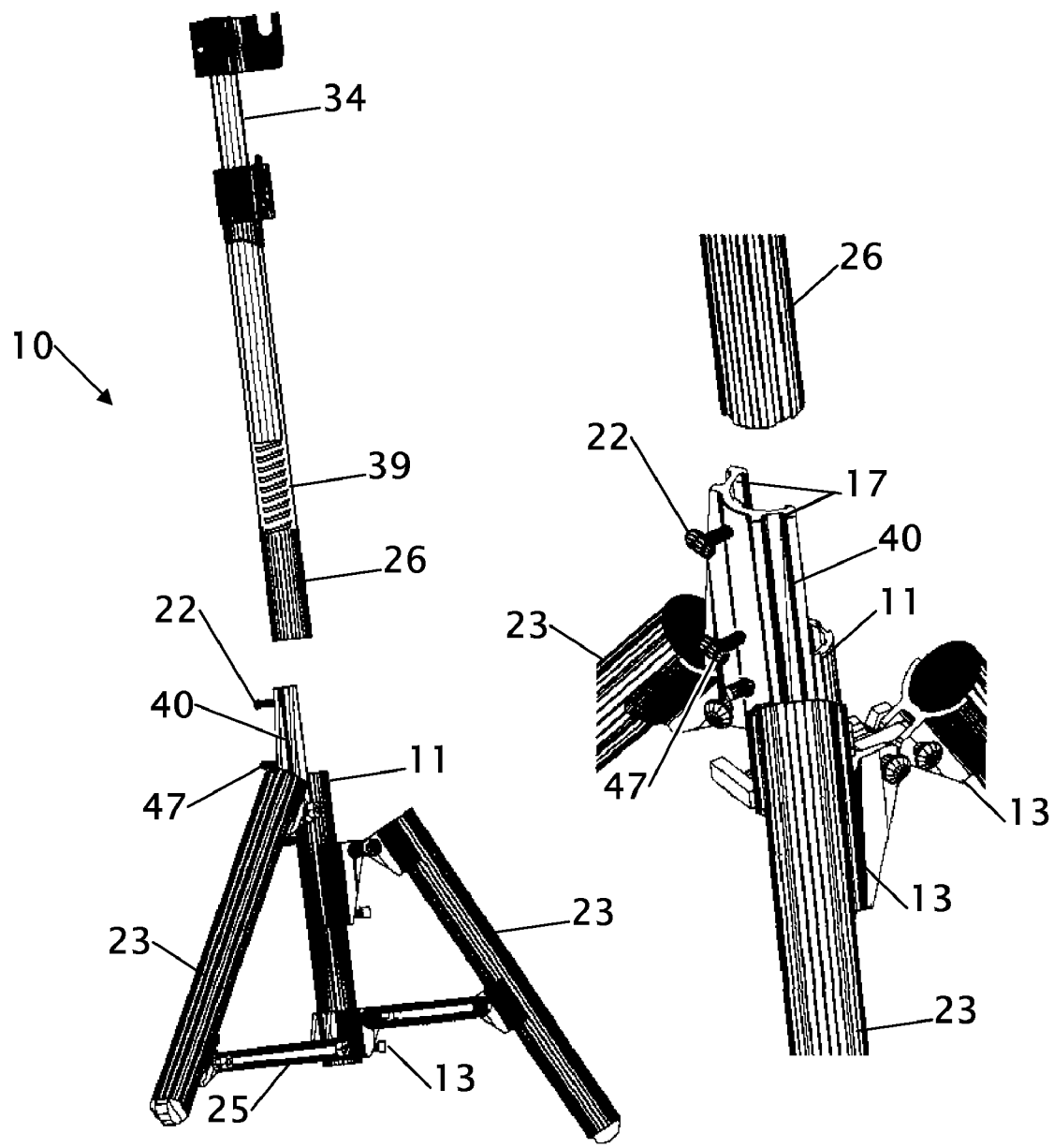
FIG. 6 is a side elevation view of another embodiment of the stand.
FIG. 7 is a detailed view of the collar portion of the stand shown in FIG. 6.

Referring to the drawings by numerals of reference, there is shown in FIGS. 1, 2, 6, 7 and 8, a preferred adjustable tripod stand 10 having a longitudinal lower upright center tube 11 and longitudinal upright center tube 26, which is fluted with a plurality of circumferentially spaced grooves 12, shown in the cross section of tubes 11 and 26 in FIG. 3, extending longitudinally of its exterior surface. There are four grooves 12 which are equally spaced and dovetail shaped in cross section. Fluted tubes 11 and 26 are used for the upright support of the tripod and for the legs 23. These legs can be the same geometry and diameter or could be constructed with different geometry or different diameters.

The upper apex of two of the legs 23 is connected to the central tube 11 with a semi-circular (half tube) leg support collar member 14. A second semi-circular (half tube) leg support collar member 14 attaches two of the legs 23 to the leg braces 24 in the mid portion of lower tube 11. It should be noted here that the semi-circular leg support 14 is used as both an upper and a lower support for the two legs where they slide and attach to the center tube 11. The upper apex of one of the legs 23 is connected to the central tube 11 with a semi-circular leg supporting collar member 13. A second semi-circular leg support collar 13 also attaches the leg 23 to the leg brace 24 in the mid portion of the lower tube 11. It should be noted here that the semi-circular leg support 13 is used as both an upper and a lower support for a single leg where they slide and attach to the center tube 11 and in addition the leg support 13 is utilized as a connection from a single tube to another tube and from a single tube to a brace such as item 25. These collars 13 and 14 are slidably mounted on center tube 11. Semi-circular leg brace support collar members 13 for one of the legs 23 and a collar member 14 for two of the legs 23 are slidably mounted on center tube 11. The center tubes and legs are shown with different diameter tubing but in some embodiments the center tube and the legs are constructed from the same tubular material.

The position of the leg brace on the leg is adjustable to change the angular arc for the leg position. Ideally the leg brace is placed in the middle of the length of the leg, but other locations of the leg brace can be set to change how far the leg can be extended from the center tube. In one contemplated embodiment one leg is shorter that the other two legs. The position of the collar 13 on the shorter leg is placed at the apex where the longer legs are secured to center tube 11. This provides additional support to the tripod stand to prevent or reduce flexing or motion while an instrument is being played.

As described above, the legs may also be extended radially inward and outward. This allows for placement of the stand on an uneven or multi-level surface or platform and also in limited or confined areas. The legs may be adjusted relative to an uneven or multi-level surface to cause the vertical axis of the stand to be disposed in an off-vertical axis position for placing the center of gravity of the supported article relative to the center of the supporting legs even if they are at different heights.

If one of the upper leg collar members 13 and its corresponding leg brace collar member 13 is moved closer together on the center tube 11, the bottom of the leg(s) connected thereto will be extended radially outward to be positioned an unequal distance from the center of the center tube 11 relative to the other leg(s).

When one of the upper leg collar members 13 and its corresponding leg brace collar members 13 is moved away from the other on the center tube 11, the bottom of the leg(s) connected thereto will be drawn radially inward to be positioned an unequal distance from the center of the tube 11 relative to the other leg(s).

As seen in FIG. 1, the upper leg collar members 13, 14 and leg brace collar members 13, 14 are movable from a position where the tripod legs are collapsed to a position where the bottom of the legs will extend radially an equal distance from the center of tubular member 11.

One collar members 13 is shown detailed in FIG. 4, and collar member 14 as shown detailed in FIG. 5. Members 13 and 14 are semi-circular in cross section with the longitudinal ears 18 and edges 17 formed inwardly to fit in the dovetail longitudinal grooves of the center tubes 11 and 26 as shown in cross sectional detail in FIG. 3. The geometry of the center tube (FIG. 3) and the geometry of the leg(s) 23 as show in FIG. 6-8 could be essentially the same allowing for interchangeability of the center tube and leg components. Collar members 13 (FIG. 4) and 14 (FIG. 5) have ears 19 with holes 20 for receiving a hinge bolt 21. FIG. 3 shows a preferred embodiment of the dovetail longitudinal grooves 12 arranged in 90 degree orientation pattern, but other arrangements including but not limited to 30, 45, 60, and 120 degree orientations or combinations thereof are contemplated that will provide the desired result.

Figure 8:
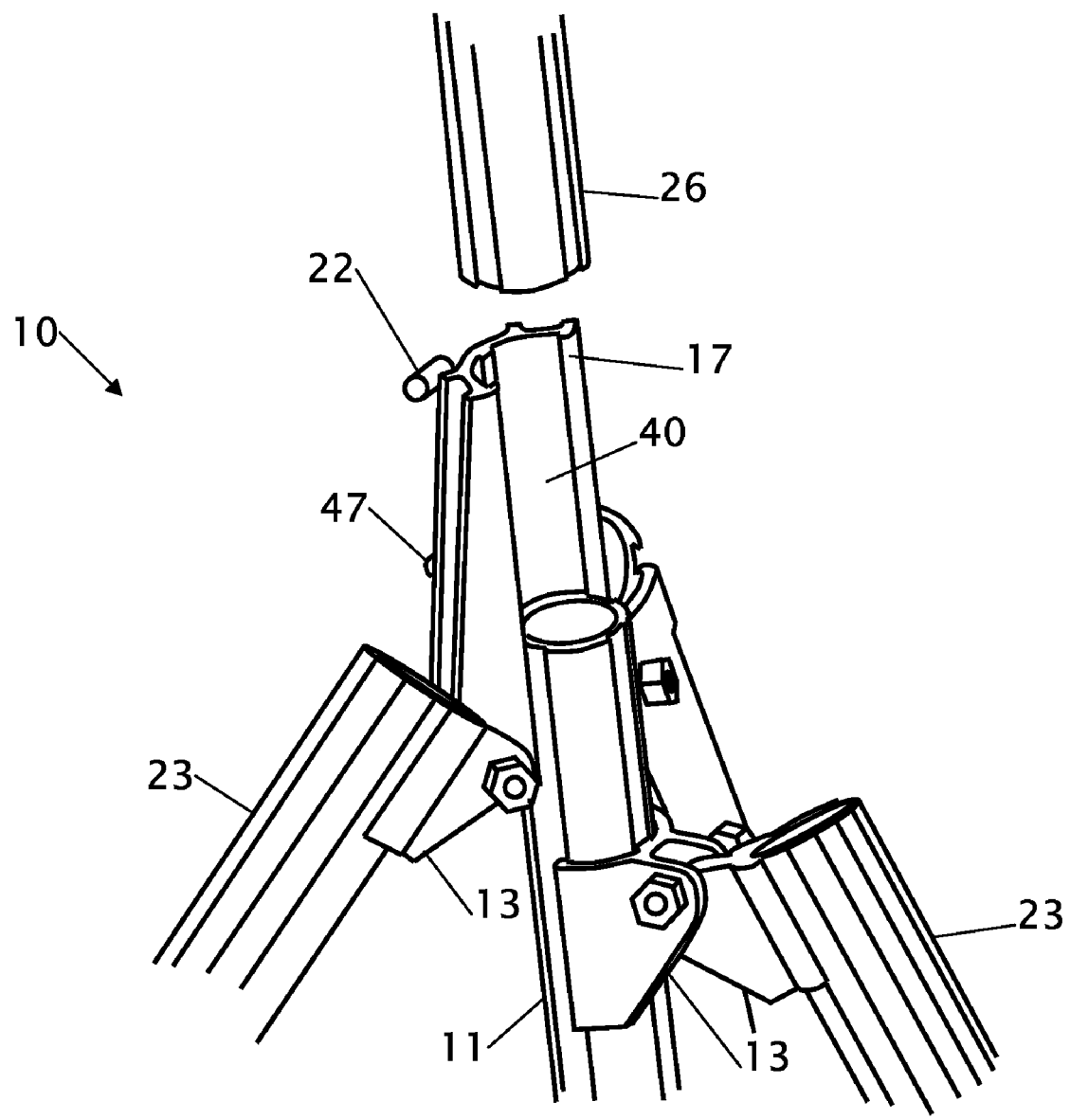
FIG. 8 is an alternate detailed view of the collar portion of the stand shown in FIG. 6.

Referring to FIGS. 6, 7 and 8 that show various details of the semi-circular locking collar 40 with the locking edges 17 in the collar 40 and corresponding dovetail grooves 42 in recesses 12 in the tubes. Because the playing height of a drum or other percussion instrument requires the instrument stand to be assembled in a tall configuration that can be difficult to transport and store, the dovetail locking feature allows the stand to be broken into shorter sections, and re-assembled into an elongated support stand. The semi-circular collar 40 partially encircles tubes 11 and 26. In the preferred embodiment, the collar is a circular arc of about 180 degrees, but it is contemplated that angles as small as 119 to less than 360 degrees can accomplish locking the tubes. The shape of the collar is fabricated from an aluminum extrusion or casting that is an elongated circular ring sector. At or near the proximal edges tabs 17 configured as tapered dovetail tabs exist. The tubes 11 and 26 have multiple recesses 12 with mating tapered grooves 42 that the dovetail edges on the collar members 17 engage in. When the collar 40 is brought into position on the tube 11 or 26 such that the collar extends beyond the end of the tube, the collar 40 is locked onto one of the tubes where it binds the collar onto one of the tubes. The locking or binding is from one or more threaded fasteners such as wing screw 47 that secures the collar 40 on the first lower center tube 11 and screw 22 that secures the second upper center tube 26 in the collar 40 (FIGS. 6 & 7) that wedges the collar dovetail tabs into the corresponding dovetail grooves in the tube 11.

Figure 16:
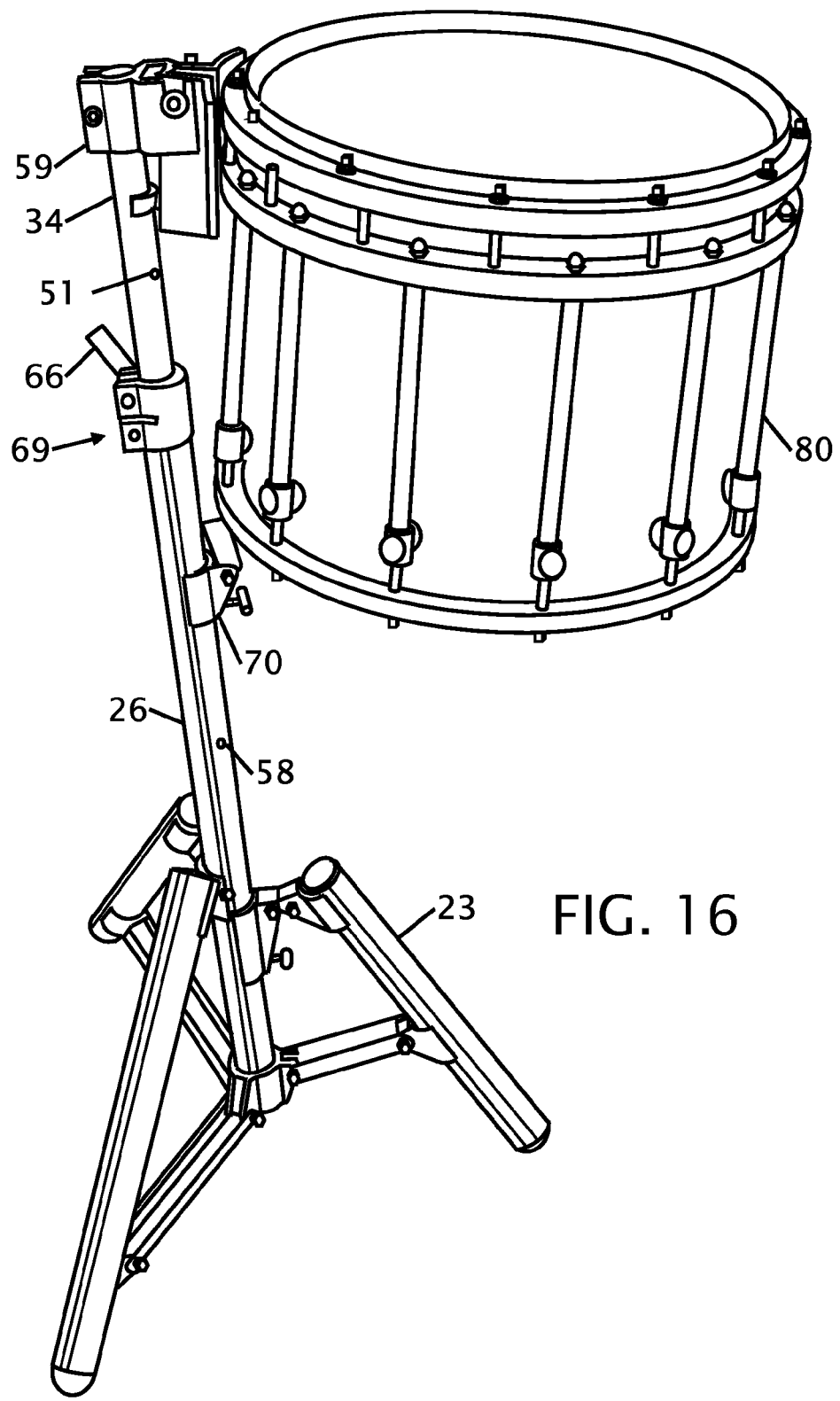
FIG. 16 is an isometric view of the extendable tripod stand with a high tension snare drum.
Figure 18:
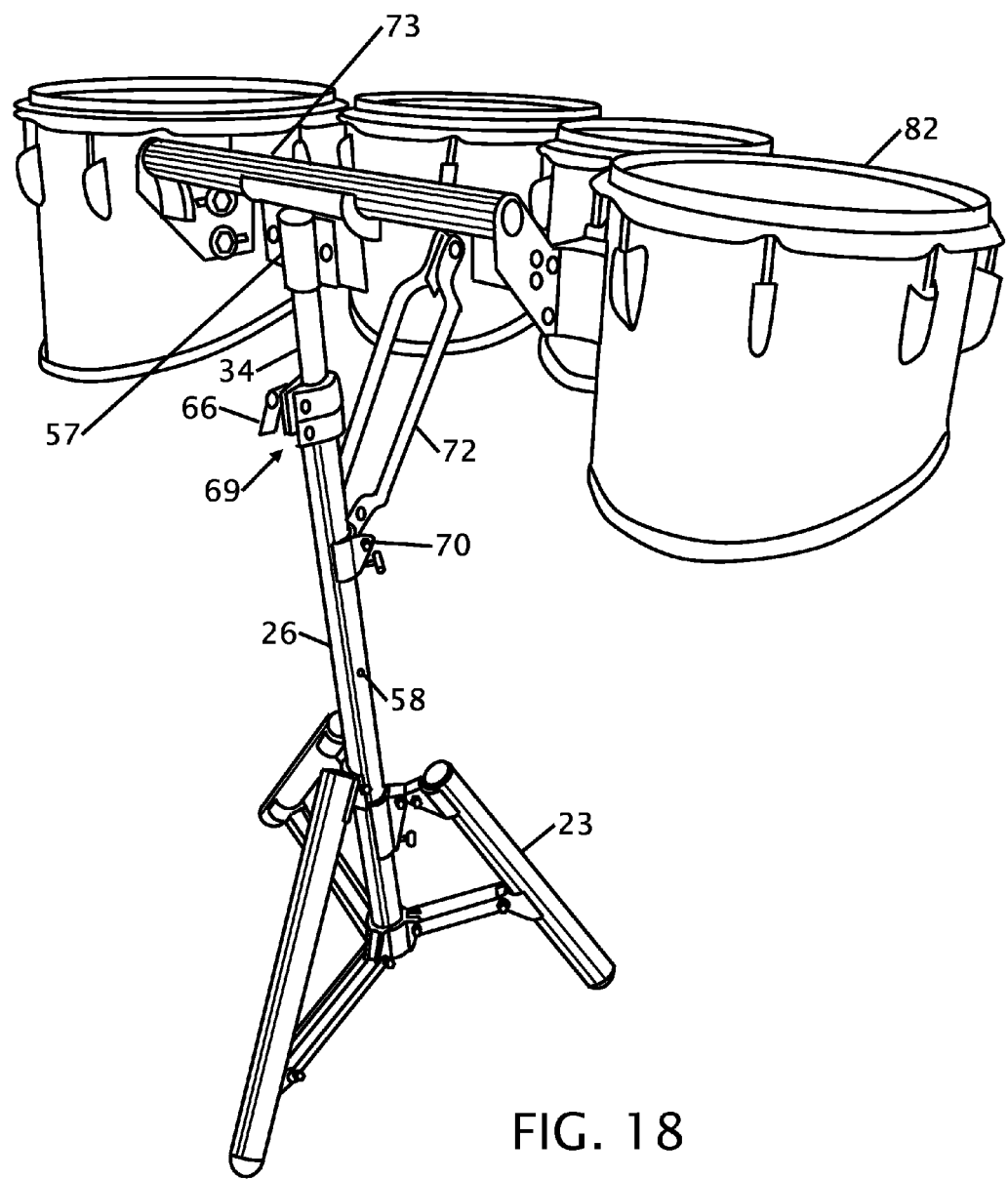
FIG. 18 is an isometric view of the extendable tripod stand with a drum array.

In the preferred embodiment one of the legs is configured in a different length than the other legs. The difference in length of the one leg produces and places the center tube in an off vertical axis or prone condition that is ideal for cantilevered placement of a percussion instrument. The cantilevered orientation allows the player to position themselves closer to the instrument being played with minimal interference from the leg(s). In the embodiments shown in FIG. 6 one leg is shorter than the remaining two legs, but it is also contemplated that the odd leg be configured longer than the odd remaining two legs. One or more of the legs can be adjusted to altered the central tube(s) 11 and 26 from a vertical orientation to effectively center the tripod base under an instrument. Referring briefly to FIGS. 16 and 18 the central tube is off of vertical and the tripod base is shown essentially under the musical instrument(s) drum(s) 80 and 82.

Each of the collar members 13, 14 and 40 (FIGS. 1-2, 6, 7 and 8) is independently movable relative to the others on tubular member 11 and 26. Wing screws 22 and 47 are provided on the collar members 13, 14, 40 and when tightened, the collar members are locked in a desired position on center tube 11 and 26 or leg tube 23.

The leg brace support collar members 13 (FIG. 2) are substantially similar in construction and operation to the upper leg support collar members 14 (FIG. 1). Each collar member 13 is semi-circular (half tube) in cross section with the longitudinal edges bent inwardly to fit in the longitudinal grooves 12.

Each collar member 13 has a wing screws 22 or thumb screw 47 for locking it in place in the same manner as collar members 13. Thus, each collar 13 is independently movable relative to the others on the center tube, and each may be locked in a desired position on the tube 11, or leg 23.

This allows for placement of the stand in limited or confined areas. If the legs are supported on a level surface, this adjustment will cause the longitudinal, vertical axis of the stand to be disposed in an off-vertical axis position for placing the center of gravity of the supported article relative to the center of the supporting legs. This adjustment also provides a minimum or maximum peripheral support base.

It can be seen from detailed FIGS. 7 and 8 that the collar 40 is locked in a position that extends above the lower tube 11. This extension above the lower tube allows the upper tube 26 to be slid down the collar and placed into position in an abutted orientation with the lower tube 11. The upper tube 26 is similar or the same extruded construction as the lower tube 11 which includes multiple recessed 12 with mating tapered grooves 42 that the dovetail edges 17 engage in. One or more threaded fasteners 22 or 47 (FIGS. 6, 7 and 8) wedge the collar dovetail tabs into the corresponding dovetail grooves in tube 26 to form an extended support shaft. In the configuration shown the collar is combined with the leg support, but other embodiments are contemplated that do not include the leg support with the collar. Only one collar is shown in the figures but it is contemplate that multiple collars, each with an extending tube can be us used to extend the assembly to a greater length. It is also contemplated that the collars can be used with the legs of the stand to provide a wider support base.

An elongate telescoping inner tubular member 34 (FIGS. 1 and 2) is slidably received within the center tube 11 and or 26 and anchored in position by a wing screw or locking clamp. It is contemplated that the telescoping tubular member can be fluted, indexed or keyed to prevent or limit rotation of the members and they extend. The upper end of inner telescoping tubular member 34 has a bracket 35 and pivoted locking member 36 for securing drums 37 in place. This tripod is designed for supporting a bongo drum but other drums may be supported if desired. In FIG. 6, a portion of upper tube 26 has been cut away showing a lift mechanism 39 that assists the inner telescoping tubular member 34. While a spring has been shown as the lift assisting mechanism other lifting mechanisms including but not limited to a spring, gas filled strut or other similar lifting mechanism are contemplated to assist a user to extend the telescoping inner tube member 34 out of the center tube 26. An embodiment shown and describing a gas filled lift strut is found in FIG. 9 herein.

The top portion of the stand may have various conventional tripod mounting hardware for mounting a variety of articles and instruments including but not limited to such things as cameras, video equipment, telescopes, surveying instruments, and musical instruments. It should be understood that the particular tripod stand illustrated has a top portion configured to support musical drums however other top portions may be provided for supporting such things as cameras, video equipment, telescopes, surveying instruments, and the like.

Figure 12:
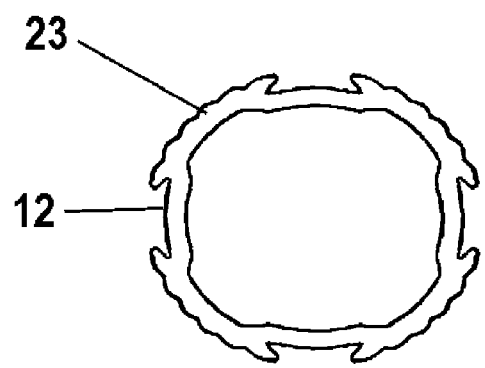
FIG. 12 is an end view of one of the center tubes or legs of the tripod.

Each of leg members 23 optionally includes a leg extender member 27 slidably supported thereon as shown in FIGS. 1, 2 and 9 and 10. Leg extender member 27 has a semi-circular (half tube) collar portion 28 and a rigid leg portion 29. Collar portion 28 has longitudinal edges 30 (FIG. 13) formed inwardly 17 to fit in the dovetail longitudinal grooves 12 (FIG. 12) for sliding movement to extend one of the leg members 23.

Center tube 11 is adjustable up or down relative to collar members 14 and 13. Leg extenders 27 are adjustable to permit the tripod assembly 10 to fit on extreme different levels, when the tripod is used on the stairs or steps of a stadium or auditorium.

Figure 9:
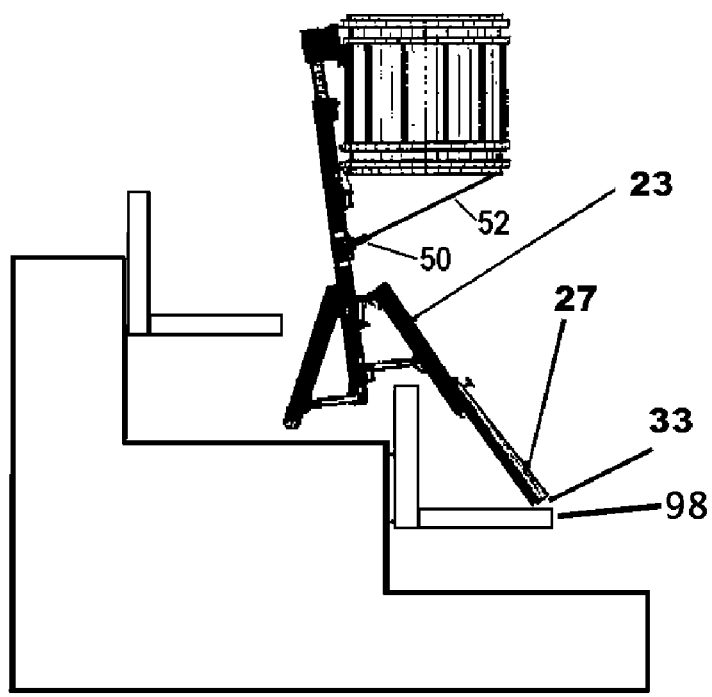
FIG. 9 is a side view of the leg extender shown in FIGS. 1, and 2.
Figure 10:
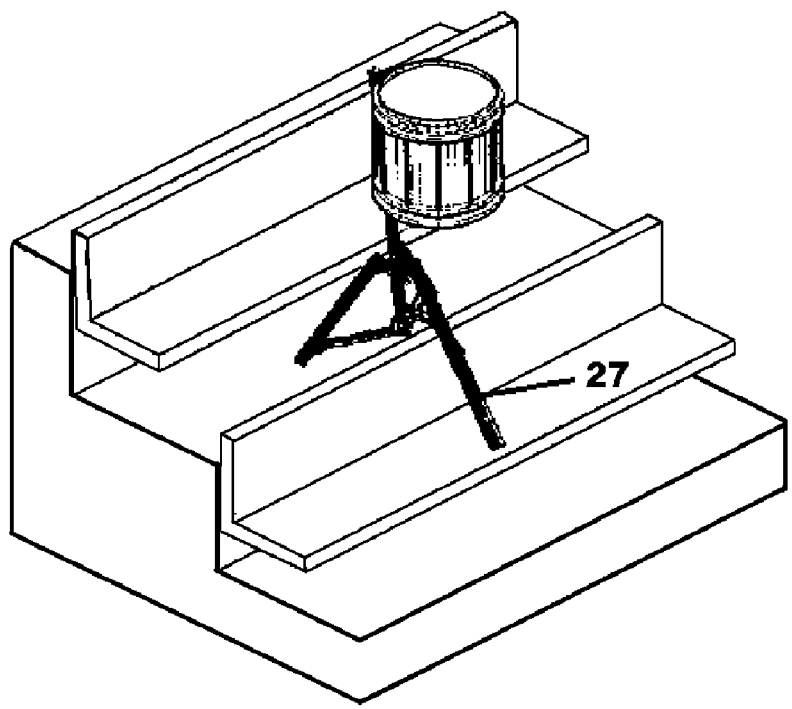
FIG. 10 is an isometric view of the tripod leg on which the extender is supported.

Referring now to FIGS. 9 and 10 that show a side elevation view and isometric view of the tripod and snare drums installed on the steps or stairs of a stadium or auditorium. Each of leg members 23 may have a leg extender member 27 slidably supported thereon. The leg extender member 27 has a semi-circular (half tube) collar portion and a rigid leg portion. The collar portion has longitudinal edges formed inwardly to fit in the dovetail longitudinal grooves 12 for sliding movement to extend one of the leg members 23. The bottom of the extendable leg member 27 is extended until it reaches ground, or in the figures shown, a lower bench 98 (FIG. 9). Foot pad 33 increases the friction between the leg extension 27 and the bench 98 to reduce movement of the stand. In FIG. 9 a pivoting bracket 52 pivots and extends from the collar to the far underside of the drum in this figure. The collar 50 may provide the link coupling of the upper and lower tube into an extended unit. The collar and bracket provide additional support to the drum to reduce the cantilevered weight of the drum and reduce movement of the drum when it is being played. The collar member engages into the dovetail elongated grooves of the center tube and includes a locking mechanism to prevent movement on the center tube.

A semi-circular (⅓ of a circle tube) upper leg support collar members 40 for one of the legs as shown in the inventor's prior applications and patents. These three sets of sliders allow the three sets of legs to move and slide independent of each other and past each other. Two or all three of the collars can be connected or linked using the holes 55 and 56 on each flange to lock the collars together. In the preferred embodiment two of the collars are linked together and the third collar is independent from the other two. The linking of the collars provides for fewer components to adjust in the field and allows for faster set-up and take down.

Each of the collar members 40 is semi-circular in cross section with the longitudinal edges 17 formed inwardly to fit in the dovetail 42 longitudinal grooves 12. Collar member(s) 40 have portion 45 with in-turned portions with dovetail features 17 and ears 19 with holes 20 for receiving a hinge bolt.

Each of the collar members 40 is independently movable relative to the others on tubular members 11 and 26. Wing screws 22 are provided on the collar members 40 and when tightened into hole 46, the collar members 40 are locked in a desired position on center tube 11 or 26. One hole is used with a fastener to lock the collar on one tube member 11 while the other hole is used with a fastener to lock the collar on a second tube member 26.

Figure 11:
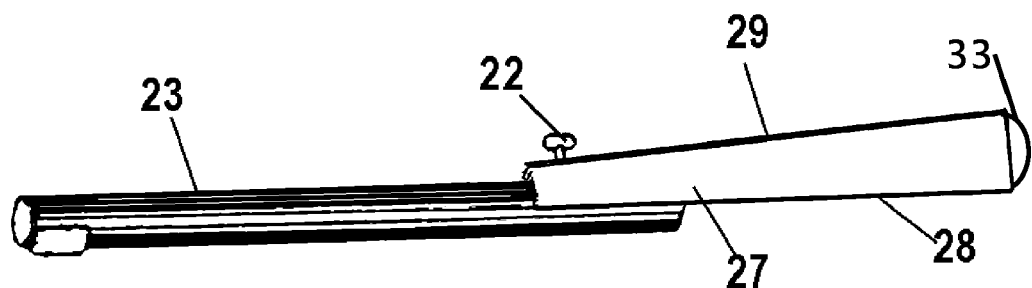
FIG. 11 is a side view of the leg extender shown in FIGS. 1, and 2.
Figure 13:
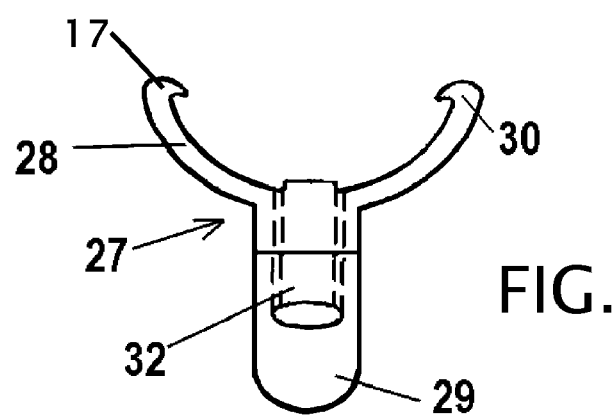
FIG. 13 is an end view of a slider that operates with the center tube and leg tube as shown in FIG. 11.

Referring now to FIGS. 11 and 13, a wing screw 22 fits threaded aperture 32 (FIG. 13) in leg extender member 27 for locking in any selected position. The bottom end of each leg extender member 27 has a footpad 33 (FIGS. 1 and 11) formed of resilient material. It should be understood that the bottom end of each leg member 27 may have a wheel or caster (not shown).

In addition to the adjustment described above, FIG. 1 shows that the upper leg support collars 14 and the leg brace collars 13 may be positioned in vertically spaced pairs relative to the other vertically spaced pair. For example, one of the upper leg collar segments 14 and its corresponding leg brace collar segment 13 may both be moved upward on the tubular member 11 relative to the other pair and the bottom of the leg(s) connected to the upper pair will be raised relative to the other leg(s) to adapt to higher or lower elevations without the need for a leg extender.

Referring now to FIGS. 9 and 10 that show a side elevation view and isometric view of the tripod and snare drums installed on the steps or stairs of a stadium or auditorium. Each of leg members 23 may have a leg extender member 27 slidably supported thereon (construction being the same as in FIGS. 11-13). The leg extender member 27 has a semi-circular (half tube) collar portion and a rigid leg portion. The collar portion has longitudinal edges formed inwardly to fit in the dovetail longitudinal grooves 12 for sliding movement to extend one of the leg members 23. The bottom of the extendable leg member 27 is extended until it reaches ground, or in the figures shown, a lower bench 98 (FIG. 9). Foot pad 33 increases the friction between the leg extension 27 and the bench 98 to reduce movement of the stand. In FIG. 9 a pivoting bracket 52 pivots and extends from the collar to the far underside of the drum in this figure. The collar 50 may provide the link coupling of the upper and lower tube into an extended unit. The collar and bracket provide additional support to the drum to reduce the cantilevered weight of the drum and reduce movement of the drum when it is being played. The collar member engages into the dovetail elongated grooves of the center tube and includes a locking mechanism to prevent movement on the center tube.

Referring now to FIG. 14 that shows is an exploded view of the extension mechanism 39. The extension/lift mechanism can be a variety of different mechanism. In FIG. 6 it is shown as a compression spring. In FIG. 14 the lift/extension mechanism is shown and described as a strut. The strut shown is a gas filled extension mechanism that naturally exists in an extended orientation. Pushing upon the two ends will compress the strut. Various different forces and extension lengths are available. When using the strut in the embodiments shown, the strut must be stopped med stroke at the length desired by the user. One contemplated embodiment of the clamping mechanism is shown and described in FIG. 15.

The strut 39 has end caps 53 and 55 that are installed with the tubes 34 and 26. A set screw or stops 51 and 58 retain the end caps 53 and 55 within the tubes 34 and 26. In one embodiment the end caps sit on the screws 51 and 58. In another embodiment the screws 51 and 58 bind the end caps 53 and 55 to prevent the inner tube 34 from being accidentally removed from the outer tube 26. A guide 54 exists in the middle of the strut 39 to reduce axial loading on the strut that could harm the seals of the strut 39. The extension mechanism can be either inserted into the inner tube 34 or in the outer tube 26. A securing means for securing a musical instrument 59 is attached to the end of the upper tube 34. The instrument securing means 59 allows a performer to install a musical instrument such as a drum or other musical instrument onto the stand. Various types of percussion musical instruments are sown in FIGS. 16-18. In this figure the securing means is a saddle 56 where a musical instrument is placed vertically into the securing means 59.

Figure 17:
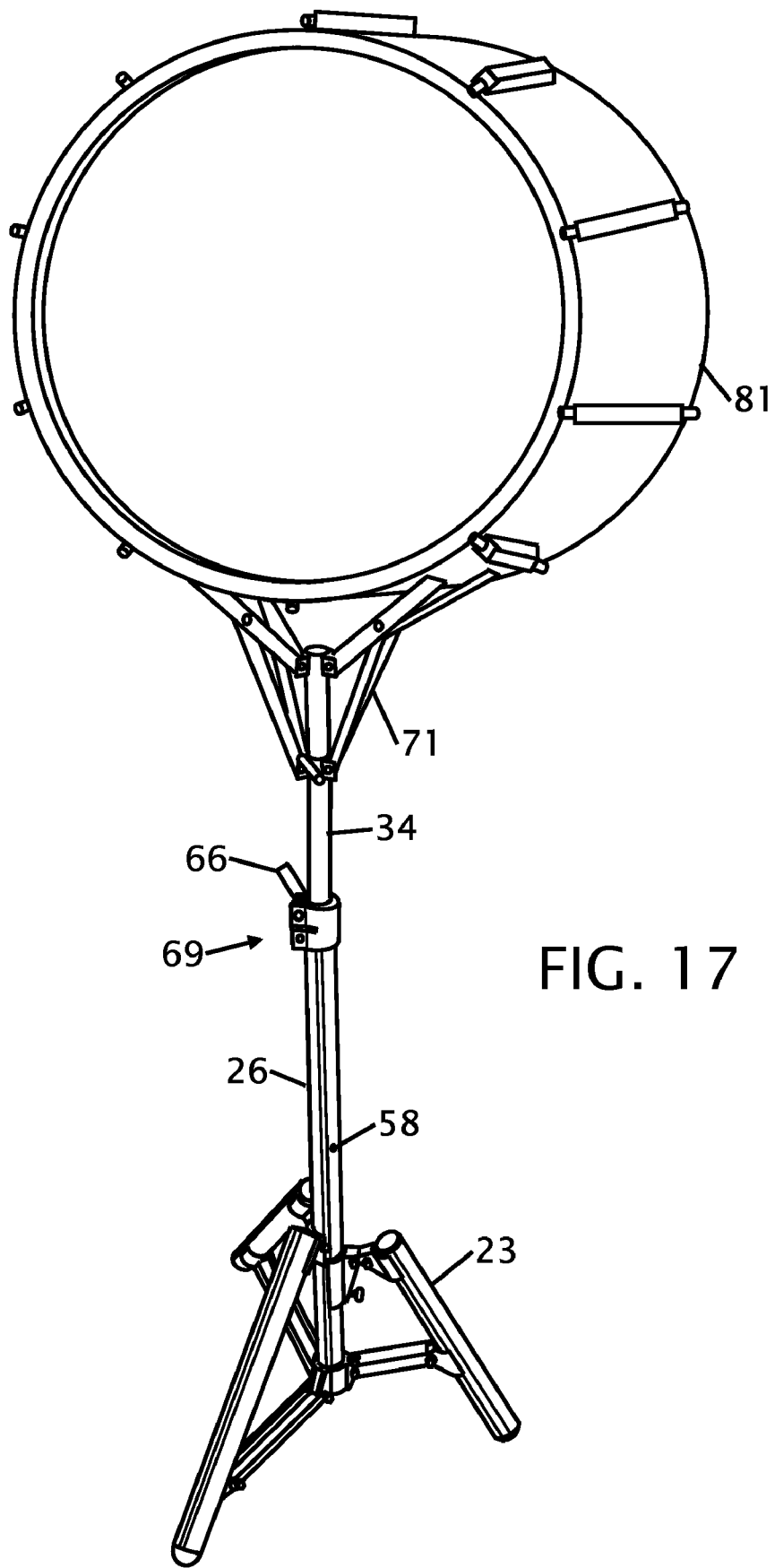
FIG. 17 is an isometric view of the extendable tripod stand with a vertically mounted bass drum.

FIG. 15 is an exploded view of the clamping mechanism 69. Referring briefly to FIGS. 16-18 the clamping mechanism 69 is shown where the lower tube 26 and the upper tube 34 intersect. The clamping mechanism is an extrusion 60 with a central hole 62 where the lower portion of the clamping mechanism 69 is secured to the lower or outer diameter tube 26. The clamping mechanism is partially split into a lower portion that is secured to the lower tube 26 (not shown) and an upper section that can temporally hold the upper tube 34 (not shown) the split 63 separates these two section and allows separate flexibility for clamping the upper and lower parts of the clamping mechanism 69. A screw 64 closes the lower portion of the clamping mechanism 69 on the lower tube. A separate screw 65 passes through the upper portion of the clamping mechanism 69 where it is threaded into as shoulder bolt 67 with a threaded hole that the screw 65 threads into. A nut 68 retains the shoulder bolt 67 on a cam arm. The cam arm 66 has an eccentric hole that allows the upper portion of the clamping apparatus/griping means to close the gap 61 onto an upper tube to prevent extension of the upper tube 34 (not shown).

FIGS. 16 to 18 show the adjustable stand with various different percussion 80-82 instruments mounted to the stand. In FIG. 16 the extendable tripod stand on a high tension snare drum. In FIG. 17 the extendable stand is mounted with a vertically mounted on a bass drum. In FIG. 18 the adjustable stand is configured with a tenor array of drums. In each of the configurations the drum can be quickly removed from a performer's body mounted carrier and installed onto the adjustable stand. In all of these configurations the base or legs 23 extend from the lower central tube 26. The extension mechanism exists inside one of the tubes where it is secured or located with screws 58 and or 51. In all of these figures the upper tube 34 is shown partially pushed out of the lower tube 26. The amount of extension of the upper tube 34 out of the lower tube 26 is determined by the performer preference and an infinite number of different heights are adjustable. The force and extension length of the extension mechanism is variable based upon the type and weight of instrument that is being supported. In the preferred embodiment the force of the extension mechanism is selected to allow for minimal force by the user to raise or lower the musical instrument 80-82 and the weight of the musical instrument is sufficient to approximately equal the force from the extension mechanism.

The strut can be fixed to the stand, or can be changeable. The clamping apparatus/griping means 69 grips the upper tube to prevent undesirable movement of the upper tube 34 while a performer is performing. The location of the tube 34 is quickly adjustable with the eccentric cam arm 66. A securing means for securing a musical instrument 57 and 59 is attached to the end of the upper tube 34. The instrument securing means 57 and 59 allows a performer to install a musical instrument 80-82 such as a drum or other musical instrument onto the stand. In some cases a support brace or bracket 70 is used to reduce the moment arm of the musical instrument on the stand as shown in FIGS. 16 and 18. In FIG. 18 a further support arm 72 extends from the brace or bracket 70 to the array of drums 82 that are mounted on a tenor rail 73 that is secured to the tenor rail saddle 57. In FIG. 17 a series of drum supports 71 hold the vertically mounted drum 81.

Thus specific embodiments and applications for an adjustable tripod stand have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A modular supporting stand comprising:
   a first center member supported by at least three legs where the position of the legs relative to the first center member is adjustable;
   a second center member that telescopes into said first center member at a first end;
   a securing means for securing a musical instrument on a second end of said second center member;
   a lift mechanism located inside said first center member and arranged to push said second center member at least partially out of said first center member;
   said lift mechanism is a compression spring or a gas filled strut, and
   a clamping apparatus secured to said first center member provided as a means for gripping said second center member to restrict extension of said second center member from said first center member at a user desirable position.

2. The modular supporting stand according to claim 1 wherein said first center member is fluted, indexed or keyed to limit rotational movement of said legs around said first center member.

3. The modular supporting stand according to claim 1 wherein said lift mechanism is replaceable to alter the lifting force and or lifting length.

4. The modular supporting stand according to claim 1 wherein said clamping apparatus uses an eccentric cam to clamp said second center member.

5. The modular supporting stand according to claim 1 wherein at least one of the at least three legs is independently adjustable for height.

6. A modular supporting stand comprising:
   a first center member supported by a base that exists from said first center member;
   a second center member that telescopes into said first center member at a first end;
   a securing means for securing a musical instrument on a second end of said second center member;
   a lift mechanism located inside said first center member and arranged to push said second center member at least partially out of said first center member;
   said lift mechanism is a compression spring or a gas filled strut, and
   a gripping mechanism arranged to provide a means for restricting extension of said second center member from said first center member at a user desirable position.

7. The modular supporting stand according to claim 6 wherein said first center member is fluted, indexed or keyed to limit rotational movement of said supporting base around said first center member.

8. The modular supporting stand according to claim 6 wherein said lift mechanism is replaceable to alter the lifting force and or lifting length.

9. The modular supporting stand according to claim 6 wherein said clamping apparatus uses an eccentric cam to clamp said second center member.

10. The modular supporting stand according to claim 6 that further includes an adjustment to alter said first center member off of a vertical orientation to effectively center said base under said musical instrument.

11. A modular supporting stand comprising:
a first center member supported by a base that exists from said first center member;
a second center member that telescopes into said first center member at a first end;
a securing means for securing a musical instrument on a second end of said second center member;
a lift mechanism located inside said second center member and arranged to push said second center member at least partially out of said first center member;
said lift mechanism is a compression spring or a gas filled strut, and
a gripping mechanism arranged to provide a means for restricting extension of said second center member from said first center member at a user desirable position.

12. The modular supporting stand according to claim 11 wherein said first center member is fluted, indexed or keyed to limit rotational movement of said supporting base around said first center member.

13. The modular supporting stand according to claim 11 wherein said lift mechanism is replaceable to alter the lifting force and or lifting length.

14. The modular supporting stand according to claim 11 wherein said clamping apparatus uses an eccentric cam to clamp said second center member.

15. The modular supporting stand according to claim 11 that further includes an adjustment to alter said first center member off of a vertical orientation to effectively center said base under said musical instrument.

* * * * *